Figure 1:
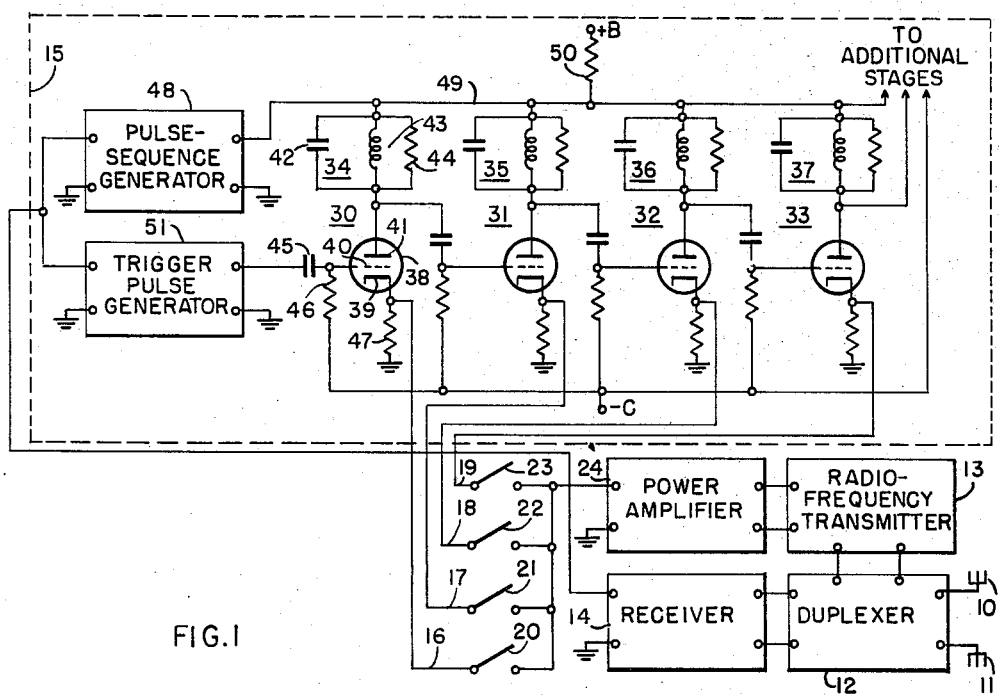

United States Patent Office 2,951,153
Patented Aug. 30, 1960

2,951,153

PULSE-DISTRIBUTION SYSTEM

Peter A. Baum, Manhasset, N.Y., assignor to Hazeltine Research, Inc., Chicago, Ill., a corporation of Illinois Filed Dec. 22, 1954, Ser. No. 476,938

3 Claims. (Cl. 250—27)

*General*

This invention relates to pulse-distribution systems and, particularly, to such systems useful in aircraft identification equipment commonly known as IFF equipment.

For aircraft identification purposes, it is sometimes desirable to have airborne identification equipment which is capable of transmitting a sequence of identification pulses in response to an interrogating signal from, for example, surface equipment. In such a system, it is desirable that such a pulse sequence be capable of including, for example, ten individual and evenly spaced pulses occupying what may be considered as pulse positions in the sequence. In this manner, certain pulses may be omitted leaving their respective positions in the pulse sequence unoccupied and thereby enabling a desired identification code to be established. Different codes may be established, of course, by omitting different ones of the pulses.

For transmitting a pulse sequence having ten possible pulse positions which are readily selectable, it is desirable to generate a sequence of ten pulses and then utilize some means for separating each of the ten pulses and translating each pulse along a different channel or signal path, the different signal paths being terminated by a pair of output terminals which are common to all the signal paths and are coupled to the transmitting apparatus. In this manner, a given pulse may be omitted and hence its position in the pulse sequence may be left unoccupied by simply interrupting or opening its individual signal path by means of a switch, thus permitting rapid and convenient changes in the identification code.

It has heretofore been proposed to obtain translation of, for example, ten separate and time-spaced pulses along ten separate signal paths by translating a pulse down a delay line having ten taps or output terminals connected therealong. Such a system, however, requires a delay line of the low-impedance type which is heavier and more bulky than is desirable in compact, lightweight, airborne equipment. Also, it is, in practice, very difficult to obtain precisely spaced pulses by this method because of the difficulty in connecting the taps or output terminals at precisely the proper point along the delay line. The lack of precision might be ameliorated by using the pulse signals from the delay-line taps to control coincidence selection of pulses from a separately generated sequence of precisely spaced pulses but equipment complexity and bulk would be multiplied and the already undesirable bulky delay line would still be present.

It is an object of the invention, therefore, to provide a new and improved pulse-distribution system for supplying individual pulses of a pulse sequence to different pulse-translating channels.

It is a further object of the invention to provide a new and improved pulse-distribution system of reduced size and weight for use in equipment where size and weight must be held to a minimum, for example, in airborne equipment.

In accordance with the invention, a pulse-distribution system for supplying individual pulses of a pulse sequence to different pulse-translating channels comprises a plurality of cascaded and normally nonconductive amplifier stages individually including a resonant output circuit coupled to the succeeding stage, the oscillatory period of each resonant circuit being related to the period between pulses of the sequence. The system also includes circuit means for simultaneously supplying the sequence of pulses to each of the amplifier stages, the amplitude of the pulses being insufficient to render an amplifier stage conductive. The system further includes circuit means for supplying a trigger pulse to the first stage synchronous with one of the pulses in the sequence to enable each stage successively to develop a brief oscillatory signal in the resonant circuit thereof in time coincidence with one of the pulses of the pulse sequence, the combined amplitude of the pulse and oscillatory signal being sufficient to render the succeeding stage conductive, thereby enabling successive pulses of the pulse sequence to trigger successive amplifier stages. The system additionally includes a plurality of pulse-translating channels individually coupled to the amplifier stages for individually translating a pulse occurring when the respective stage is rendered conductive.

For a better understanding of the present invention, together with other and further objects thereof, reference is had to the following description taken in connection with the accompanying drawing, and its scope will be pointed out in the appended claims.

Figure 2:
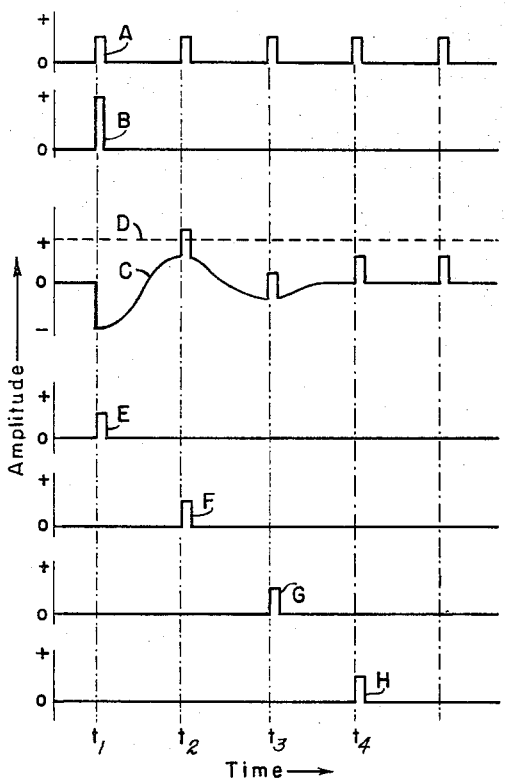

Referring to the drawing:

Fig. 1 is a circuit diagram, partly schematic, of aircraft identification apparatus including a pulse-distribution system constructed in accordance with the present invention, and Fig. 2 is a graph representing signals developed at various points of the Fig. 1 apparatus and used in explaining the operation thereof.

*Description and operation of Fig. 1 apparatus*

Referring to Fig. 1 of the drawing, the aircraft identification apparatus, commonly known as IFF apparatus, there represented is suitably mounted aboard an aircraft in a conventional manner. The apparatus comprises an antenna system 10, 11 coupled to a duplexer 12 which, in turn, is coupled to both a radio-frequency transmitter 13 and a receiver 14. The duplexer 12 is a conventional protective device for enabling the receiver and transmitter to utilize the same antenna system without danger of the high-power bursts of energy from the transmitter overloading or injuring the receiver 14.

Interrogating signals from interrogating equipment aboard, for example, a surface vessel seeking to learn the identity of the aircraft are received by the antenna system 10, 11 and supplied through the duplexer 12 to the receiver 14. The receiver 14 is effective to amplify and detect the interrogating signals and, in response thereto, develop a suitable control signal. The control signal is, in turn, supplied to a pulse-distribution system 15 constructed in accordance with the present invention as will be discussed more fully hereinafter. In response thereto, the pulse-distribution system 15 generates a sequence of, for example, four time-spaced identification pulses individually appearing on one of the plurality of conductors 16–19, inclusive.

These identification pulses from the pulse-distribution system 15 are then supplied through the corresponding switches 20–23, inclusive, to the common input terminals of a conventional power amplifier 24 wherein they are amplified and, in turn, supplied to the radio-frequency transmitter 13. The radio-frequency transmitter 13, in response to these amplifier identification pulses, develops corresponding bursts or pulses of radio-frequency energy which are supplied through the duplexer 12 to the antenna system 10, 11 from which they are radiated.

The radiated identification pulses are then intercepted by the surface equipment and serve to identify the aircraft transmitting them. As mentioned, various ones of the pulses of the sequence may be omitted to establish a desired identification code. This may readily be accomplished by leaving the corresponding ones of the switches 20–23, inclusive, in an open position. The apparatus, of course, need not be limited to transmitting a sequence of four pulses, the number four having been selected for ease of presentation on the drawing. For more than four pulses in the sequence, it will be apparent that additional switches corresponding to switches 20–23, inclusive, may be utilized.

*Description of Fig. 1 pulse-distribution system*

The pulse-distribution system 15 of Fig. 1 represents a pulse-distribution system constructed in accordance with the present invention for supplying individual pulses of a pulse sequence to different pulse-translating channels and comprises a plurality of cascaded and normally nonconductive amplifier stages, for example, the stages 30–33, inclusive, individually including a resonant output circuit coupled to the succeeding stage. The resonant circuits individually associated with each stage are represented, for example, by the resonant circuits 34–37, inclusive.

The first amplifier stage 30 includes, for example, an electron-discharge device 38 having a cathode 39, a control electrode 40, and an anode 41. The resonant circuit 34 is preferably coupled to the anode 41 and may include, for example, a condenser 42 connected in parallel with an inductor 43 and also connected in parallel with a damping resistor 44. Coupled to the control electrode 40 is a coupling condenser 45 for translating signals supplied thereto to the control electrode 40 and a resistor 46 for coupling the control electrode 40 to a source of negative bias —C of sufficient magnitude to render the device or tube 38 nonconductive in the absence of the required input signal. Coupled to the cathode 39 of the tube 38 are a cathode resistor 47 and an output signal path or channel 16. Each of the additional amplifier stages 31–33, inclusive, may be identical in structure to that of stage 30 so that a detailed recitation of their structures is unnecessary.

The pulse-distribution system 15 also includes circuit means for simultaneously supplying a sequence of pulses to each of the amplifier stages, for example, the stages 30–33, inclusive, the amplitude of the pulses being insufficient to render an amplifier stage conductive. This circuit means may comprise, for example, a pulse-sequence generator 48 connected by way of conductor 49 to the resonant circuits of each stage, an operating potential +B for the amplifier tubes being supplied to the conductor 49 by way of a resistor 50.

The pulse-distribution system 15 further includes circuit means for supplying a trigger pulse to the first stage 30 to enable each stage successively to develop a brief oscillatory signal in the resonant circuit thereof in time coincidence with one of the pulses of the pulse sequence, the combined amplitude of the pulse and oscillatory signal being sufficient to render the succeeding stage conductive, thereby enabling successive pulses of the pulse sequence to trigger successive amplifier stages. This circuit means may comprise, for example, a trigger pulse generator 51 coupled to the control electrode 40 of the first amplifier stage 30. The input terminals of the trigger pulse generator 51 are coupled in common with the input terminals of the pulse-sequence generator 48 both of which are, in turn, coupled to the output terminals of the receiver 14 for receiving control signals therefrom.

The pulse-distribution system 15 additionally includes a plurality of pulse-translating channels, for example, the conductors 16–19, inclusive, individually coupled to the cathodes of the respective amplifier stages for individually translating the pulse rendering each stage conductive.

As will become apparent hereinafter, the pulse-distribution system is not limited to four stages, as shown in Fig. 1, and additional amplifier stages may be added, as indicated, to the last-shown amplifier stage 33.

*Operation of Fig. 1 pulse-distribution system*

Considering the operation of the pulse-distribution system just described, it will be assumed initially that no pulses are being supplied by the generators 48 and 51 and that the negative potential —C supplied to each of the control electrodes is sufficient to maintain each of the amplifier stages nonconductive. In response to a control signal from the receiver 14 which, in turn, was caused by an interrogating signal from the surface equipment, the pulse generator 48 is caused to supply a sequence of pulses, as represented by curve A of Fig. 2, to each of the amplifier stages 30–33, inclusive. For the stage 31, for example, the pulse sequence is supplied through the resonant circuit 34 of the preceding stage 30 to the control electrode of the amplifier stage 31. In a similar manner, the pulse sequence is supplied to the control electrodes of the subsequent amplifier stages. The amplitude of these pulses is insufficient to render any of the amplifier stages conductive.

The trigger pulse generator 51 is also responsive to the control signal from the receiver 14 to develop a trigger pulse, represented by curve B of Fig. 2, occurring at time $t_1$ in time coincidence with the first pulse of the sequence represented by curve A. This trigger pulse from the generator 51 is effective to render the first amplifier stage 30 conductive during the duration thereof. In response to the sudden conduction of the amplifier stage 30, the resonant circuit 34 undergoes a brief period of oscillation, the oscillatory signal developed thereby being represented by curve C of Fig. 2. This oscillatory signal rapidly dies out due to the presence of the damping resistor 44. The frequency of this oscillatory signal is such that it reaches its maximum amplitude at time $t_2$ in coincidence with the second pulse of the sequence. The combined amplitude of the pulse and oscillatory signal, as represented by curve C, is sufficient to render the succeeding amplifier stage 31 conductive during the duration of the second pulse of the sequence represented by curve A. This is indicated by the fact that the combined amplitude of the pulse and oscillatory signal of curve C exceeds the cutoff level of the amplifier stage 31 which is represented by curve D of Fig. 2.

In order that the oscillatory signal might reach its maximum amplitude in time coincidence with the second pulse of the sequence, it is necessary that the oscillatory period of the oscillatory signal be made equal to twice the period $t_1$–$t_2$ between the first and second pulses of the sequence. This may be achieved by selecting the condenser 42 and inductor 43 so as to have a parallel-resonant frequency of one-half the frequency represented by the period between the pulses. If desired, the oscillatory period of the resonant circuit 34 may be adjusted so that the oscillatory signal does not reach its maximum amplitude until the occurrence of the pulse at time $t_3$ and, in this manner, causing the pulse-generating system to select only every other pulse.

Each of the succeeding amplifier stages 32 and 33 is rendered conductive during the occurrence of the succeeding pulses at times $t_3$ and $t_4$ of the pulse sequence in the same manner as stage 31 was rendered conductive during the occurrence of the pulse at time $t_2$. In this manner, successive pulses of the pulse sequence are able to trigger successive amplifier stages.

By having only the pulse portion of the combined pulse and oscillatory signal exceed the cutoff level of each stage, as represented by curve D, there is produced across the cathode resistor of each stage, for example, across the cathode resistor 47 of the first stage 30 a pulse of duration equal to the duration of the pulse rendering the stage conductive. In this manner there is developed at the cathode of the first stage at time $t_1$ a pulse represented by curve E of Fig. 2. In a corresponding manner, pulses as represented by curves F, G, and H appear across the cathode resistors of the amplifier stages 31, 32, and 33. Each of these pulses is then translated by way of the corresponding conductors or signal-translating channels 16–19, inclusive, to the equipment designed to utilize such pulses.

One of the major advantages of the present invention is that it results in a pulse-distribution system of substantially less size and weight than comparable systems of this type heretofore proposed. In a previous system, for example, where it was proposed to utilize a delay line having a plurality of taps therealong, the presence of such a plurality of taps necessitated the use of a low-impedance delay line, for example, a 180-ohm line in order that the effect of the impedance discontinuities introduced by the taps might be insignificant with respect to the impedance of the delay line. The lower the impedance of the delay line the greater is the amount of distributed capacitance that is required and, hence, the greater is the size of the delay line. One such delay line of this type has been found to weigh 4 pounds and occupy a space of 64 cubic inches. It has been found that a pulse-distribution system constructed in accordance with the present invention and utilizing tubes of the subminiature type reduced by one-half each of these size and weight factors. This fact is of considerable importance where the pulse-distribution system is to be utilized in equipment, such as airborne equipment, which must be as compact and lightweight as is possible.

From the foregoing description of the invention, it will be apparent that a pulse-distribution system constructed in accordance with the present invention represents a new and improved system for supplying individual pulses of a pulse sequence to different pulse-translating channels. While the present invention has been particularly described in the environment of aircraft identification apparatus, it will be apparent that such a system is not limited thereto and may be utilized in any apparatus requiring a pulse-distribution system of this type.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pulse-distribution system for supplying individual pulses of a pulse sequence to different pulse-translating channels, the system comprising: a plurality of cascaded and normally nonconductive amplifier stages individually including a resonant output circuit coupled to the succeeding stage, the oscillatory period of each resonant circuit being related to the period between pulses of the sequence; circuit means for simultaneously supplying the sequence of pulses to each of the amplifier stages, the amplitude of the pulses being insufficient to render an amplifier stage conductive; circuit means for supplying a trigger pulse to the first stage synchronous with one of the pulses in said sequence to enable each stage successively to develop a brief oscillatory signal in the resonant circuit thereof in time coincidence with one of the pulses of the pulse sequence, the combined amplitude of the pulse and oscillatory signal being sufficient to render the succeeding stage conductive, thereby enabling successive pulses of the pulse sequence to trigger successive amplifier stages; and a plurality of pulse-translating channels individually coupled to the amplifier stages for individually translating a pulse occurring when the respective stage is rendered conductive.

2. A pulse-distribution system for supplying individual pulses of a pulse sequence to different pulse-translating channels, the system comprising: a plurality of cascaded and normally nonconductive amplifier stages individually including a resonant output circuit coupled to the succeeding stage, the oscillatory period of each resonant circuit being twice the period between pulses of the sequence; circuit means for simultaneously supplying the sequence of pulses to each of the amplifier stages, the amplitude of the pulses being insufficient to render an amplifier stage conductive; circuit means for supplying a trigger pulse to the first stage synchronous with one of the pulses in the sequence to enable each stage successively to develop a brief oscillatory signal in the resonant circuit thereof in time coincidence with one of the pulses of the pulse sequence, the combined amplitude of the pulse and oscillatory signal being sufficient to render the succeeding stage conductive, thereby enabling successive pulses of the pulse sequence to trigger successive amplifier stages; and a plurality of pulse-translating channels individually coupled to the amplifier stages for individually translating a pulse occurring when the respective stage is rendered conductive.

3. A pulse-distribution system for supplying individual pulses of a pulse sequence to different pulse-translating channels, the system comprising: a plurality of cascaded and normally nonconductive electron-discharge devices individually having a cathode, a control electrode, and an anode and individually including a resonant anode circuit coupled to the control electrode of the succeeding electron-discharge device, the oscillatory period of each resonant circuit being related to the period between pulses of the sequence; circuit means for simultaneously supplying the sequence of pulses to the control electrodes of each of the electron-discharge devices, the amplitude of the pulses being insufficient to render an electron-discharge device conductive; circuit means for supplying a trigger pulse to the control electrode of the first electron-discharge device synchronous with one of the pulses in said sequence to enable each electron-discharge device successively to develop a brief oscillatory signal in the resonant anode circuit thereof in time coincidence with one of the pulses of the pulse sequence, the combined amplitude of the pulse and oscillatory signal being sufficient to render the succeeding electron-discharge device conductive, thereby enabling successive pulses of the pulse sequence to trigger successive electron-discharge devices; and a plurality of pulse-translating channels individually coupled to the cathodes of the electron-discharge devices for individually translating a pulse occurring when the respective stage is rendered conductive.

References Cited in the file of this patent

UNITED STATES PATENTS

| | | |
|---|---|---|
| 2,076,335 | Dallenbach | Apr. 6, 1937 |
| 2,210,574 | Fitch | Aug. 6, 1940 |
| 2,418,375 | Tourshou | Apr. 1, 1947 |
| 2,567,944 | Krause | Sept. 18, 1951 |
| 2,577,355 | Oliver | Dec. 4, 1951 |
| 2,632,880 | Flowers | Mar. 24, 1953 |
| 2,642,526 | Gallay | June 16, 1953 |